(12) United States Patent
Paudel

(10) Patent No.: US 11,249,742 B1
(45) Date of Patent: Feb. 15, 2022

(54) SYSTEMS AND METHODS FOR ZERO-TOUCH INFRASTRUCTURE BUILD AUTOMATION

(71) Applicant: JPMORGAN CHASE BANK, N.A., New York, NY (US)

(72) Inventor: Neel K. Paudel, Plain City, OH (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/033,193

(22) Filed: Sep. 25, 2020

(51) Int. Cl.
*G06F 8/61* (2018.01)
*G06F 16/242* (2019.01)

(52) U.S. Cl.
CPC ............ *G06F 8/63* (2013.01); *G06F 16/2445* (2019.01)

(58) Field of Classification Search
CPC .............................. G06F 8/63; G06F 16/2445
See application file for complete search history.

(56) References Cited

U.S. PATENT DOCUMENTS

| | | | | |
|---|---|---|---|---|
| 8,140,624 B2* | 3/2012 | Gingell | ...................... | G06F 8/63 709/205 |
| 8,583,650 B2* | 11/2013 | Fellenstein | ............... | G06F 8/63 707/740 |
| 9,703,680 B1* | 7/2017 | Chang | ........................ | G06F 8/60 |
| 9,983,891 B1* | 5/2018 | Christensen | .............. | G06F 8/63 |
| 10,268,185 B2* | 4/2019 | Bliss | ........................ | G05B 19/04 |
| 10,289,436 B1* | 5/2019 | Keagy | ................. | G06F 9/45533 |
| 2004/0025155 A1* | 2/2004 | Sedlack | ..................... | G06F 8/63 717/174 |
| 2007/0234346 A1* | 10/2007 | Kramer | ..................... | G06F 8/61 717/174 |
| 2008/0040714 A1* | 2/2008 | Wheeler | .................... | G06F 8/63 717/174 |
| 2011/0246981 A1* | 10/2011 | Braun | .................... | G06F 9/4416 717/175 |
| 2013/0132950 A1* | 5/2013 | McLeod | ............. | G06F 9/45558 718/1 |

(Continued)

OTHER PUBLICATIONS

Alagiannis et al., "An Automated, Yet Interactive and Portable DB Designer", Jun. 2010, ACM (Year: 2010).*

(Continued)

*Primary Examiner* — Wei Y Zhen
*Assistant Examiner* — Junchun Wu
(74) *Attorney, Agent, or Firm* — Greenberg Traurig LLP

(57) ABSTRACT

Systems and methods for zero-touch infrastructure build automation are disclosed. A method may include: receiving an input file including a hardware requirement and an installation type; validating hardware requirements for the server installation on a target host; calling a build API to create a plurality of active directory accounts and to assign required roles; creating a service account, a system account, and a user account; validating and approving the service account, the system account, and the user account, and creating a configuration file; downloading a build automation packet on the target host based; provisioning a database instance to the target host; downloading and extracting server and binary tools from a source location to the target host; initiating server unattended installation on the target host; installing client connectivity and configuration tools on the target host; and installing organization-specific tools on the target host.

16 Claims, 2 Drawing Sheets

(56) References Cited

U.S. PATENT DOCUMENTS

| | | | | |
|---|---|---|---|---|
| 2014/0172783 A1* | 6/2014 | Suzuki | ............... | G06F 8/63 |
| | | | | 707/609 |
| 2014/0325501 A1* | 10/2014 | Hirano | ............... | G06F 8/63 |
| | | | | 717/174 |
| 2015/0281225 A1* | 10/2015 | Schoen | ............. | H04L 63/06 |
| | | | | 726/9 |
| 2018/0121186 A1* | 5/2018 | Chen | ................ | G06F 9/4416 |
| 2021/0072974 A1* | 3/2021 | Kludy | .............. | H04L 9/3213 |

OTHER PUBLICATIONS

Agrawal et al., "Automated Selection of Materialized Views and Indexes for SQL Databases", 2000, International Conference on Very Large Databases (Year: 2000).*

Papadomanolakis et al., "Automating Schema Design for Large Scientific Databases Using Data Partitioning", 2004, IEEE (Year: 2004).*

Uehara et al., "Enterprise Model-based Software Architecture with Server Component Integration", 1998, IEEE (Year: 1998).*

Pinheiro et al., "Introducing Automated Environment Configuration Testing in an Industrial Setting", Dec. 2014, ResearchGate (Year: 2014).*

* cited by examiner

SYSTEMS AND METHODS FOR ZERO-TOUCH INFRASTRUCTURE BUILD AUTOMATION

1. FIELD OF THE INVENTION

The present disclosure generally relates to systems and methods for zero-touch infrastructure build automation.

2. DESCRIPTION OF THE RELATED ART

Microsoft SQL Server is a popular relational database management system. Organizations often use tools to automate the build and provisioning of applications to Microsoft SQL Server. As technology evolves, tools that once were suitable for use are no longer compatible.

SUMMARY OF THE INVENTION

Systems and methods for zero-touch infrastructure build automation are disclosed. In one embodiment, in an information processing apparatus comprising at least one computer processor, a method for zero-touch infrastructure build automation of a server on a target host may include: (1) receiving an input file for a server build comprising a payload file including a hardware requirement and an installation type; (2) validating hardware requirements for the server installation on a target host based on hardware requirements; (3) calling a build API to create a plurality of active directory accounts and to assign required roles to perform the server build and for running services; (4) creating a service account, a system account, and a user account; (5) validating and approving the service account, the system account, and the user account, and creating a configuration file; (6) downloading a build automation packet on the target host based on the input file; (7) provisioning a database instance to the target host; (8) downloading and extracting server and binary tools from a source location to the target host; (9) initiating server unattended installation on the target host using the configuration file and a template that may include based on the installation type; (10) installing client connectivity and configuration tools on the target host; and (11) installing organization-specific tools on the target host.

In one embodiment, the installation type may include one of a standalone server installation, prepared failover cluster server installation, and a complete failover cluster server installation.

In one embodiment, the hardware requirements may include a memory requirement, a storage requirement, and a CPU requirement.

In one embodiment, the method may further include creating a non-human account for the server build; and adding the non-human account to an admin group at an operating system level.

In one embodiment, the configuration file may include generated based on a file generation task value in the input file and a template for the installation type.

In one embodiment, wherein the server tools may include SQL server tools.

In one embodiment, the organization-specific tools may include security tools.

In one embodiment, the server may be installed on a plurality of target hosts.

According to another embodiment, a system for zero-touch infrastructure build automation of a server on a target host may include a production file server comprising a computer processor and executing a build automation program; an application server that provides an input file comprising a payload file including a hardware requirement and an installation type for a server build; and a target host. The build automation program may receive an input file for a server build comprising a payload file including a hardware requirement and an installation type; validate hardware requirements for the server installation on a target host based on hardware requirements; call a build API to create a plurality of active directory accounts and to assign required roles to perform the server build and for running services; create service account, a system account, and a user account; validate and approve the service account, the system account, and the user account, and creating a configuration file; download a build automation packet on the target host based on the input file; provision a database instance to the target host; download and extract server and binary tools from a source location to the target host; initiate server unattended installation on the target host using the configuration file and a template that may include based on the installation type; install client connectivity and configuration tools on the target host; and install organization-specific tools on the target host.

In one embodiment, the installation type may include one of a standalone server installation, prepared failover cluster server installation, and a complete failover cluster server installation.

In one embodiment, the hardware requirements may include a memory requirement, a storage requirement, and a CPU requirement.

In one embodiment, the build automation program may further create a non-human account for the server build; and add the non-human account to an admin group at an operating system level.

In one embodiment, the configuration file may include generated based on a file generation task value in the input file and a template for the installation type.

In one embodiment, the server tools may include SQL server tools.

In one embodiment, the organization-specific tools may include security tools.

In one embodiment, the server may be installed on a plurality of target hosts.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are generally directed to systems and methods for zero-touch infrastructure build automation.

Embodiments may integrate with "Automation As A Service" (AAAs) micro services that will automate the entire MSSQL Server Build process.

Embodiments may provide the ability to customize builds with minimal manual intervention to support the custom configuration, which may use mount point disks for different MS SQL Server database components, such as Data, Log, TempDB, ETL drives, etc.

Embodiments may provide some or all of the following functionality: MSSQL Server Prebuild configuration; MSSQL Server Base installation with selected database components and tools; Post build MSSQL Server configuration to meet pre-defined MS SQL server standard and best practice.

Embodiments may be integrated with automatic build reporting capability. Thus, the status and stage of the build may be tracked, and up-to-date information may be provided to the customer and project team.

In one embodiment, the PowerShell-based automated solution significantly reduces build time, both for standalone and cluster instances.

Embodiments may perform pre-configuration, base installation, and post configuration with single action.

Embodiments may solution fully integrate with AAAs micro services which may be consumed database automation tool. An example of such a tool is MoonRacker.

Embodiments may eliminate a database as a service (DBaaS) layer as well as database automation products, which reduces complexity and costs (e.g., licensing costs, hardware costs, day-to-day support and monitoring costs, etc.

Embodiments may support standalone patterns, failover cluster instance (FCI) patterns, and always-on SQL instances for various MSSQL Server Always-On patterns on both VSI and PSI platform.

Embodiments may expand to other features as part of automation build, such as MS SQL Server NetBackup configuration, once the NetBackup solution available to automate and integrate with upstream build process.

Figure 1:
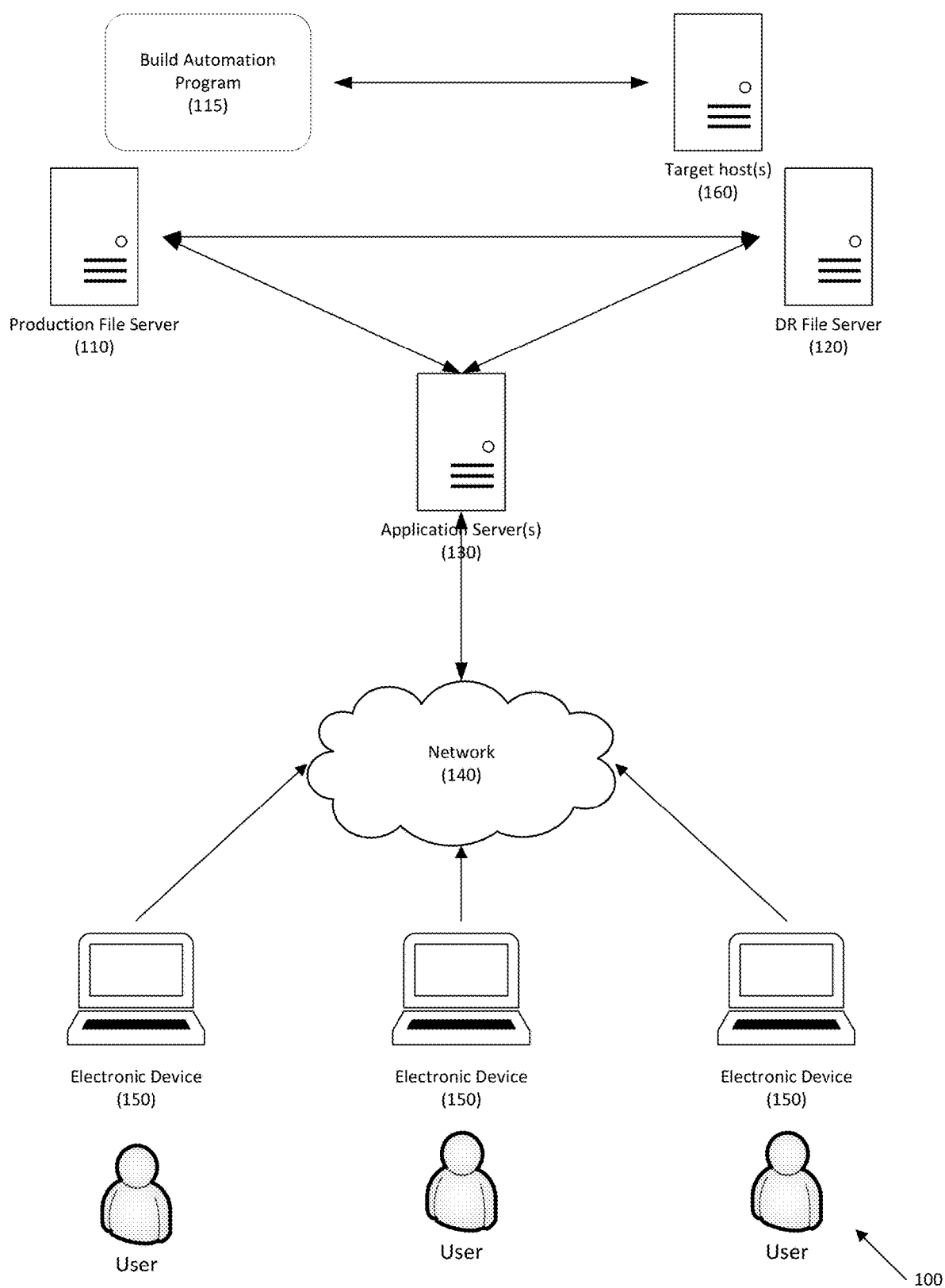
FIG. 1 depicts a system for zero-touch infrastructure build automation according to one embodiment.

Referring to FIG. 1, a system for zero-touch infrastructure build automation is disclosed according to one embodiment. System 100 may include production file server(s) 110, Disaster Recovery file server(s) 120, application server(s) 130, network 140, one or more electronic device 150, and one or more target host 160. For example, target host(s) 160 may be server(s) on which the SQL server is to be installed.

In one embodiment, production file server(s) 110 may store SQL server binaries and build automation program 115. The SQL build server automation program may be transferred to the new SQLs server database prior to the installation.

In one embodiment, production file server(s) 110 may include a primary replica of SQL server binaries and build automation program.

DR file server(s) 120 may include a secondary replica of SQL server binaries and build automation program.

Application server(s) 130 may host a web application that provides a web interface for users to access other tools, such as a virtual machine, a host build, a data storage configuration tool, etc., and place a new order for a SQL server build. In one embodiment, application server(s) 130 may host various tools supporting the build of the virtual/physical machine with require Disk Storage, Memory, and Processor (CPU).

Users may access build automation program 115 using electronic devices 150 via network 140.

Figure 2:
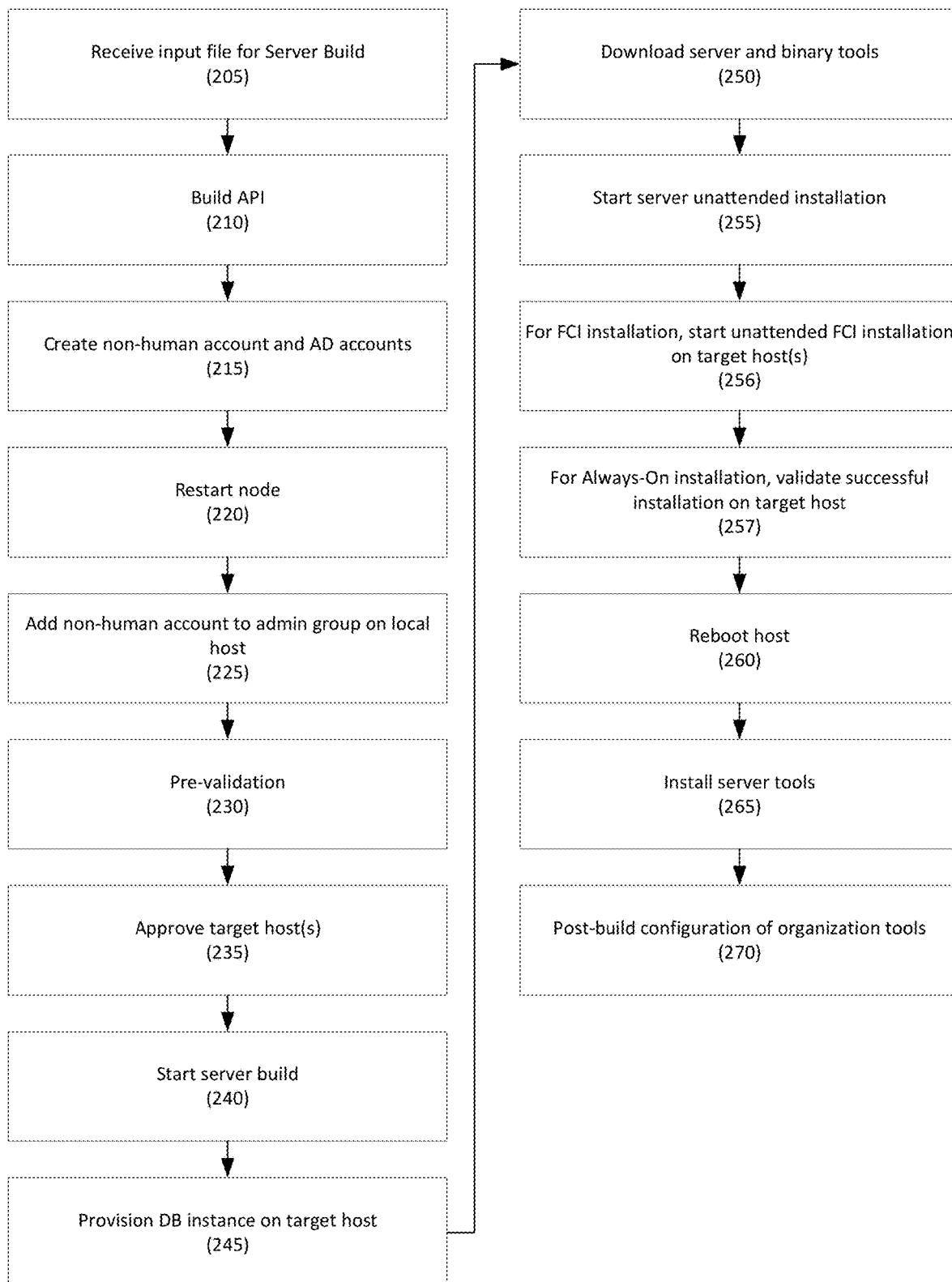
FIG. 2 depicts a method for zero-touch infrastructure build automation according to one embodiment.

Referring to FIG. 2, a method for zero-touch infrastructure build automation is disclosed according to one embodiment.

In step 205, an input file for the server build may be received. For example, an API may receive a payload file, such as a JSON payload file prepared by a workflow manager such as, for example, Magister workflow. The input file may include a hardware requirement for the server (e.g., memory, storage, CPU) and an installation type (e.g., standalone, prepared failover cluster, complete failover cluster, etc.). The input file may be converted into a readable format. The hardware required for the build may be validated and approved.

In step 210, a build API may be called. In embodiments, this may create one or more system account with the required permission that are used by automation to install the server. Once all information collected and pre-validation target action is successfully completed, automation initiates the action to process further.

In step 215, using an API, one or more non-human account, and one or more active directory accounts, may be created. For example, this may include creating required account IDs to perform the build, for running services after the build is complete, etc. It may further assign roles to these accounts.

In step 220, the node and/or host may be restarted. This ensures that the required components are available to start the server build.

In step 225, a functional account/login used by the operation may be added to the admin group on the operating system level of the target host. An example of such is adding SQLADMxxx to Local Admin.

In step 230, the target host may be pre-validated. For example, the components on the target host may be validated for the require ID, that the storage and windows services are configured correctly, etc.

In step 235, the target host may be approved for the required configuration. For example, the automated build process may check the validation log to confirm validations of the nodes and/or the host.

In one embodiment, the approval step may include generating a configuration file. For example, the configuration file may be generated based on a value defined in an input parameter file generation task and a template that is based on the installation type.

In step 240, the server build may be started. For example, based on the input file, the process may download the build automation to the target host, and may pre-configure and/or customize the server.

In step 245, a database instance may be provisioned to the target host.

In step 250, tools, such as SQL and binary tools, may be downloaded from a source location before they are placed on the target host and extracted.

In step 255, the server unattended installation may be started. In one embodiment, the installation file may use the configuration file and the input file to begin installation.

In step 256, if the installation type is a failover cluster instance, unattended FCI installation may be initiated on each target host. For example, this may include building two individual servers on two target hosts, that may be combined into a single target host.

In one embodiment, the FCI installation may then be initiated on the primary target host.

In step 257, if the installation type is an always-on SQL server instance or a failover cluster instance, the installation of all target hosts may be validated. This may include, for example, validating the target host, storage, and any other configuration needed to meet the requirements for the server installation.

In step 260, the target host may be rebooted, which may reboot/restart the target host to clean up the log and pending reboot status.

In step 265, server tools may be installed on the server instance. For example, the required client connectivity/configuration tools, such as SSMS required to connect to the server instance form the target host, may be installed.

In step 270, post-build configuration actions may be performed. For example, the server may be configured with specific security tools, roles, and other configurations that may be specific to the organization.

It should be recognized that although several different embodiments are disclosed, these embodiments are not exclusive. Thus, although certain features may be disclosed in the context of one embodiment, the features may be used any embodiment as is necessary and/or desired.

Hereinafter, general aspects of implementation of the systems and methods of the embodiments will be described.

The system of the embodiments or portions of the system of the embodiments may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A method for zero-touch infrastructure build automation of a server on a target host, comprising:
   in an information processing apparatus comprising at least one computer processor:
      receiving an input file for a server build comprising a payload file including a hardware requirement and an installation type;
      validating hardware requirements for the server installation on a target host based on hardware requirements;
      calling a build API (Application Programming Interface) to create a plurality of active directory accounts and to assign required roles to perform the server build and for running services;
      creating a service account, a system account, and a user account;
      validating and approving the service account, the system account, and the user account, and creating a configuration file;
      downloading a build automation packet on the target host based on the input file;
      provisioning a database instance to the target host;
      downloading and extracting server and binary tools from a source location to the target host;
      initiating server unattended installation on the target host using the configuration file and a template that is based on the installation type;
      installing client connectivity and configuration tools on the target host; and
      installing organization-specific tools on the target host.

2. The method of claim 1, wherein the installation type is one of a standalone server installation, prepared failover cluster server installation, and a complete failover cluster server installation.

3. The method of claim 1, wherein the hardware requirements comprise a memory requirement, a storage requirement, and a CPU (Central Processing Unit) requirement.

4. The method of claim 1, further comprising:
creating a non-human account for the server build; and
adding the non-human account to an admin group at an operating system level.

5. The method of claim 1, wherein the configuration file is generated based on a file generation task value in the input file and a template for the installation type.

6. The method of claim 1, wherein the server tools comprise SQL (Structured Query Language) server tools.

7. The method of claim 1, wherein the organization-specific tools comprise security tools.

8. The method of claim 1, wherein the server is installed on a plurality of target hosts.

9. A system for zero-touch infrastructure build automation of a server on a target host, comprising:
a production file server comprising a computer processor and executing a build automation program;
an application server that provides an input file comprising a payload file including a hardware requirement and an installation type for a server build; and
a target host;
wherein:
the build automation program receives an input file for a server build comprising a payload file including a hardware requirement and an installation type;
the build automation program validates hardware requirements for the server installation on a target host based on hardware requirements;
the build automation program calls a build API to create a plurality of active directory accounts and to assign required roles to perform the server build and for running services;
the build automation program creates service account, a system account, and a user account;
the build automation program validates and approves the service account, the system account, and the user account, and creating a configuration file;
the build automation program downloads a build automation packet on the target host based on the input file;
the build automation program provisions a database instance to the target host;
the build automation program downloads and extracts server and binary tools from a source location to the target host;
the build automation program initiates server unattended installation on the target host using the configuration file and a template that is based on the installation type;
the build automation program installs client connectivity and configuration tools on the target host; and
the build automation program installs organization-specific tools on the target host.

10. The system of claim 9, wherein the installation type is one of a standalone server installation, prepared failover cluster server installation, and a complete failover cluster server installation.

11. The system of claim 9, wherein the hardware requirements comprise a memory requirement, a storage requirement, and a CPU requirement.

12. The system of claim 9, wherein the build automation program creates a non-human account for the server build and adds the non-human account to an admin group at an operating system level.

13. The system of claim 9, wherein the configuration file is generated based on a file generation task value in the input file and a template for the installation type.

14. The system of claim 9, wherein the server tools comprise SQL server tools.

15. The system of claim 9, wherein the organization-specific tools comprise security tools.

16. The system of claim 9, wherein the server is installed on a plurality of target hosts.

* * * * *